Patented May 29, 1945

UNITED STATES PATENT OFFICE 2,377,237

2,377,237
ZEIN DISPERSIONS AND PROCESSES OF MAKING SAME

Albert Luther James, Western Springs, Ill., assignor to Corn Products Refining Company, New York, N. Y., a corporation of New Jersey No Drawing. Application August 3, 1940, Serial No. 351,274

1 Claim. (Cl. 106—153)

This invention relates to zein dispersions and to processes for producing the same; and the primary object of the invention is the production of stable aqueous dispersions of zein in its natural dry and undissolved state, that is to say, without being first dissolved in alcohol or other solvent of zein.

Zein is soluble in aqueous alcohol and in many other organic solvents. It is not soluble in water.

In the co-pending application of Charles Waldo Stewart for "Water miscible alcoholic zein dispersions," filed August 1, 1940, Serial No. 349,288, processes are disclosed employing certain dispersing agents for the production of stable zein dispersions containing relatively large quantities of water, much larger quantities than the usual zein alcohol solution will tolerate without precipitation of the zein. This Stewart process involves, however, the presence of a sufficient amount of alcohol, or other organic solvent of zein, to dissolve the zein and form therewith a flowable solution. That is, it is a process for treating zein in solution for the purpose of making the solutions miscible with large volumes of water. No claim to such a process is made herein. The present invention is, in fact, based upon the further discovery that, by the use of dispersing agents of the same general class and having similar characteristics, as those disclosed in the Stewart application, zein in its natural, dry, pulverulent state, and without being first dissolved in any of the common solvents of zein, may be dispersed in water in substantially all proportions, to form dispersions which are, to all intents and purposes, permanently stable. The term "zein" is, therefore, used herein in its narrow and literal sense, excluding zein in the state of solution.

The object of the present invention is accomplished by incorporating with the mixture of zein and water, a water soluble, highly ionized, dispersing agent, containing, in addition to a hydrophilic group of atoms (implied by water solubility and ionization) a hydrophobic group which attaches itself to the zein either by loose chemical combination therewith or by surface attraction, whereby dispersion of the zein in the water is made possible.

By the term "stable dispersion" is intended a condition wherein the zein is either in a dissolved or in a colloidal state, or at least in such a highly dispersed or distributed condition in the water that no precipitation of zein will take place when the dispersion is allowed to stand for long periods of time. The degree of dispersion and of stability, and the physical characteristics of such dispersions, may, however, vary to some extent according to the particular dispersing agents used. In most cases the dispersions are clear solutions, even at relatively high dilutions, and will pass through filter paper. In some cases, however, the dispersions are of a gelatinous nature. (See Example 20 below.)

The term "aqueous zein dispersion" is used herein and in the appended claim in distinction to "zein solution" to mean that the zein is dispersed, by means of a dispersing agent, in water as a medium instead of being dissolved directly by means of a solvent. The term "aqueous zein dispersion" does not exclude the use in the dispersion of alcohol, or other zein solvents, in quantity insufficient to dissolve the zein in the form of a flowable solution.

The products of the present invention may be used, among other purposes, for the production of films; for the coating or impregnating of paper, cardboard, textile fabrics and the like; for the production of laminated articles; as vehicles for pigments and dyes; in the production of plastics; and for the manufacture of filaments.

The use of zein dispersed in water instead of being dissolved in alcohol, or other organic solvent, has the obvious advantage of the cheapness of the medium. It has the further advantage of being less penetrating than the usual zein alcohol solutions, when applied to more or less porous materials such as paper, kraft paper, for example, so that a smaller quantity of it need be used for coating purposes or as a vehicle for pigments or dyes, in which latter case the aqueous dispersion involves savings not only of the vehicle but also of the pigment or dye.

Examples of dispersing agents suitable for the purposes of this invention include the following water soluble, highly ionized classes of compounds containing eight or more carbon atoms: (1) the alkali metal, ammonia, and amine soaps; (2) the sulfonated vegetable oils; (3) the sulfated and sulfonated fatty acids and the alkali metal, ammonia, amine and other water soluble salts of said sulfated and sulfonated fatty acids; (4) the sulfated and sulfonated fatty alcohols and the alkali metal, ammonia, amine and other water soluble salts of said sulfated and sulfonated fatty alcohols; (5) the alkali metal, ammonia, amine, and other water soluble salts of alkyl, aryl, alkyl aryl, and heterocyclic sulfonic acids; (6) the salts of aryl carboxylic acids; and (7) derivatives of any of these groups which contain at least 8 carbon atoms in the organic radical and substituent group taken together.

These dispersing agents contain, in addition to a hydrophilic group, implied by water solubility and a high degree of ionization, a hydrophobic group which attaches itself to the zein either by loose chemical combination (as occurs in the hydration of a salt), or by surface action, and thereby, apparently, effects the dispersion of the zein in the water. The hydrophobic group comprises a hydrocarbon chain within the broad organic groups known as aliphatic (octyl a decyl); aromatic (benzyl and naphthyl); hydroaromatic (cyclopentyl); and heterocyclic (furfuryl and pyridyl). Such compounds usually will not be effective as a dispersing agent for zein, in accordance with the present invention, unless the carbon chain contains 8 or more carbon atoms, including where there is substitution, the carbon atoms of both the organic radical and the substituent groups.

The dispersing agent is highly ionized, in distinction to the ordinary zein solvents such as the alcohols which are either not ionized at all or are very slightly ionized. In referring to zein solvents herein, by that term, the intention is to designate the common organic solvents of zein which, as stated, are either not ionized at all or are very slightly ionized, and not to include in this term the dispersing agents of this invention, which, however, in a sense at least, have a solvent effect on the zein.

The dispersing agents are non-reactive with the zein in the sense of not forming permanent compounds therewith or modifications thereof.

All of the substances of the before mentioned groups of substances may be used for the purposes of the present invention, some with greater and some with less effect; and with, it may be said, variations in the characteristics of the resulting products.

Specific examples of group (1) are the alkali metal soaps viz.: potassium stearate, sodium stearate (which gives a dispersion of gelatinous character), and the potassium and sodium salts of the following organic acids: palmitic, myristic, lauric, capric, caprylic, oleic, linoelic, linolenic, ricinoleic, and combinations of these such as are present in natural oils, for example, the fatty acids of linseed oil, corn (maize) oil, cotton seed oil and castor oil, the natural resin acids such as abietic acid and highly acid resins such as shellac and manila gum.

Also the ammonia soaps, for example: the ammonia soap of linseed oil fatty acid, the ammonia soap of naphthenic acid, the ammonia salt of tall oil, and in fact the ammonia soaps of any of the acids or acidic materials referred to above in connection with the alkali metal soaps.

Also the amine soaps, for example: the soap of lauric acid and triethanolamine, the soap of lauric acid and monomethylamine, the morpholine soap of rosin, and the soaps of any of the acids, referred to above in connection with the alkali metal soaps, with any of the aliphatic amines including the mono- di- and trimethyl, ethyl butyl, propyl and amyl amines, morpholine, pyridine and mono- di- and tri-ethanolamines.

Specific examples of group (2) are: sulfonated castor, corn (maize), soya bean, and linseed oils. It will be understood that these sulfonated oils are the water soluble products of commerce obtained by neutralizing the reaction products of the oil and the sulfonating agent with an alkaline material.

Specific examples of group (3) are: the alkali metal, ammonia, amine, and other water soluble salts of sulfonated and sulfated ricinoleic acid, oleic acid, linoleic acid, and of the fatty acids derived from castor, linseed, soya bean, cotton seed, corn and any other vegetable oil.

Specific examples of group (4) are: sodium lauryl sulfate, and the sodium, potassium, ammonia and amine salts of sulfonated and sulfated octyl, lauryl, myristyl, palmityl and stearyl alcohols.

Specific examples of group (5) are: isopropyl naphthalene sulfonic acid and its isomers.

A specific example of group (6) is the sodium salt of monobutyl phthalate.

A specific example of group (7) is Igepon A. P. (the sodium salt of oleyl-ethane sulfonic acid).

The dispersion may be produced in a concentrated form, that is, with a relatively low water content, in order to reduce the cost of packaging and shipment, and the material diluted with water to any desired extent before using.

With the majority of dispersing agents, as given above, the most useful dispersions will be obtained if the pH is maintained relatively close to the neutral point. However, in certain cases where the acidic radical of the dispersing agent is highly ionized and water soluble, it will be possible to make satisfactory dispersions, for some purposes at least, which have pH's that are relatively low. With sulfonated oils it is possible to obtain a stable dispersion having a pH as low as 5.5, although such dispersions are not ordinarily practical or desirable as coating materials. These low pH dispersions are particularly sensitive to salting out in the presence of relatively small amounts of inorganic salts. In the case of certain sulfonic acids, or sulfuric acid derivatives, it is possible to produce satisfactory dispersions having pH's as low as 1.5. These have been obtained with oleyl ethane sulfonic acid salt (see Example 22 below.

In the preparation of these aqueous dispersions of zein, it is necessary to avoid the presence of appreciable amounts of salting out agents; that is, of any electrolyte such as sodium chloride, sodium sulfate, sodium carbonate, or excess of alkali such as sodium hydroxide, which will have the effect of salting out the zein-dispersing agent combination from the dispersion formed by the addition of water and the dispersing agent to the zein. For this reason it is advisable to avoid the use of an excess of such alkaline material. The sensitivity of these dispersions to the salting out effect will be dependent upon the nature of the dispersing agent, the pH of the solution and the proportions of the various materials in the dispersion.

The relationship between the amounts of zein and dispersing agent in these mixtures will be dependent on the nature of the dispersing agent and on the degree to which it is desired to dilute the resulting mixture. In general, and for practical applications, the amount of dispersing agent will vary from between 40% and 100% by weight based on the weight of the zein. These, however, are not to be regarded as critical limits. The use of lesser amounts of the dispersing agent will in some cases be effective, while the use of larger amounts, unnecessary to keep the zein in the dispersed condition, may be desirable for certain specific applications.

This invention contemplates the possibility of using the alcohols, or other solvents of zein, in quantities insufficient to dissolve the zein, thus distinguishing from the aforesaid Stewart application in which the zein is dispersed after first being dissolved by a zein solvent to form a solution of zein. In the present case the alcohol, or other zein solvent, in the cases in which it is used, is employed for different purposes, for example for reducing viscosity. See Examples 23 and 24.

Where the dispersing agent can be dissociated to yield a volatile basic material, such as ammonia, the water resistance of the final product, the zein film for example, may be increased by heating the film to dissociate such dispersing agent and drive off its volatile component leaving the acidic component of the dispersing agent as a plasticizer and substance for improving water resistance. (See Example 3 below.)

Another method of increasing water resistance is to treat the film, or other solid zein body deposited from or formed from the aqueous zein dispersion, with a precipitating agent which will combine with the positive ion of the dispersing agent and liberate the corresponding acid in insoluble form, which acid will then act as a plasticizer for the zein. Generally speaking, any treatment which effects liberation of free acid from the dispersing agent will result, to a greater or less extent, in the plasticizing of the zein and will give increased water resistance of the product. Instances of such treatment are given in Examples 11 and 25.

The following are specific examples of the application of the invention to practice. It will be understood that the operating data given in these examples are purely informative and typical and are not to be regarded as limitations upon the invention; the intention being to cover all equivalents and all workable variations in proportions, as well as all other modifications within the scope of the appended claims. In the examples the proportions are given by weight, except as indicated. Variations in proportions are given, in some instances, by figures in parentheses, which, however, are not critical proportions but merely practical working ranges.

*Example 1.*—The compound is composed of the following ingredients in proportions by weight as follows:

| | Parts | |
|---|---|---|
| Zein | 15 | |
| Sulfonated castor oil | 9 | (9–20) |
| Water | 10 | |

The dispersion can be made either by mixing in the cold until dispersion takes place, or if quicker results are desired, by heating the ingredients at temperatures between 60° and 70° C. (140°–158° F.). The resultant product is a thick, smooth paste to which may be added about 75 parts more of water to give a good coating solution.

This formula gives a very flexible film. The sulfonated castor oil apparently acts as a plasticizer.

As a good substitute for sulfonated castor oil one may use sulfonated tea seed oil.

In this and the other examples it is assumed that the zein will contain the usual amount of moisture of air dry zein, viz: about 8% by weight.

*Example 2.*—The compound consists of the following substances in proportions as follows:

| | Parts | |
|---|---|---|
| Zein | 15 | |
| Sulfonated linseed or soyabean oil | 15 | (10–20) |
| Concentrated ammonium hydroxide | 2 | (1½–5) |
| Water | 75 | |

In place of linseed or soyabean oil one may use any water miscible sulfonated oil which does not contain substantial amounts of free acid.

The water may be in any proportions desired.

The coating formed in accordance with Example 2 is not as water-resistant as the coating using sulfonated castor oil in accordance with Example 1. However, its water resistance may be increased by heating the film to drive off the ammonia.

*Example 3.*—A zein-water dispersion producing a coating of excellent water-resistance can be produced in accordance with the following formula:

| | Parts | |
|---|---|---|
| Zein | 75 | |
| Tall oil | 50 | (50–100) |
| Concentrated ammonium hydroxide | 10 | (10–15) |
| Water | 85 | |

Tall oil, a by-product of the paper pulp industry, consists of about 50% of fatty acids, mostly palmitic, oleic and linoleic acids, 35% of rosins, or abietic acids, and 15% of sterols.

The tall oil is mixed with the ammonium hydroxide and preferably heated to 80° C. (176° F.) to form ammonium soap. The soap is mixed with the zein and 10 parts of water and the mixture is warmed to form a smooth paste to which the rest of the water is added.

When the coating is dried or baked, the ammonia from the ammonium soap is evaporated leaving only the tall oil and zein in the film. In the production of soaps for use in this invention, ammonia has the advantage over metal alkalies in that it is volatilizable so as to be removed from the film during drying. Other non-volatile alkalies will, necessarily, remain in the film and may have some reactive effect on the zein. Therefore, the use of ammonia is preferred, although the other alkalies are possible equivalents.

*Example 4.*—Sulfated fatty alcohols or their alkali, ammonia or amine salts, may also be used as zein dispersing agents. The following is a typical formula, using a sulfated fatty alcohol known as Duponal M. E. which is a sodium lauryl sulfate.

| | Parts | |
|---|---|---|
| Zein | 10 | |
| Sodium lauryl sulfate | 8 | (8–10) |
| Water | 60 or more | |

In place of sodium lauryl sulfate one may use sodium oleyl sulfate, known as Duponal L. S.

*Example 5.*—In this formula the dispersing agent is an alkali fatty acid soap. The formula is as follows:

| | Parts | |
|---|---|---|
| Zein | 10 | |
| Ammonium stearate | 6 | (4–10) |
| Water | 60 or more | |

In place of ammonium stearate it is possible to use any readily water soluble salt of a fatty acid containing over 12 carbon atoms for example sodium oleate or potassium palmitate.

*Example 6.*—Certain types of dyes may be incorporated in aqueous zein dispersions made in accordance with the present invention. The resulting compositions have the advantage, over the ordinary alcoholic dye vehicles in that they may be applied to porous surfaces with a minimum of penetration, thus permitting a large saving of dye consumption and also saving of the vehicle. The following is a practical formula:

| | Parts |
|---|---|
| Zein | 15 |
| Sulfonated castor oil | 10 |
| Water | 75 |
| Phosphotungstic lake of a basic dye | 2 to 5 |

Typical of the lakes suitable for the above compounds are Halopont pink, made by the Du Pont Company, soluble American blue made by Heller & Merz Company, and Persian red 3-12 C made by Holland Aniline Dye Company.

Films formed from this composition have good covering power and when spotted with water the dye will not dissolve from the coating. Preferably, the mixture of zein and sulfonated castor oil is heated to 75° C. (167° F.)

Acid and direct dyes may be used in the formula.

*Example 7.*—The formula here is the same as Example 6, except that metallic pigments are used in place of lakes. As an example of such pigments one may use Canary Chrome Yellow made by Heller and Merz Company and Alcoa Albron Paste 15.71, made by the Aluminum Company of America.

*Example 8.*—The vehicle composition here given is such as to make practical the use particularly of acid dyes. This formula is based upon the discovery that by using a mixture of sulfonated castor oil and tall oil soap, a zein dispersion is obtained from which the zein will not be precipitated by acid dyes. The formula is as follows:

|  | Parts |
| --- | --- |
| Zein | 150 |
| Sulfonated castor oil | 10 |
| Tall oil | 35 |
| Ammonium hydroxide | 7 |
| Water | 500 |

The castor oil is optional. It appears to increase the flexibility of the film. If omitted the amount of tall oil should be proportionally increased.

With 80 parts of the vehicle produced as above is mixed 3 parts of a concentrated acid dye, 1 part of ammonium hydroxide and 50 parts of water. A suitable acid dye is National green made by the National Aniline Company.

*Example 9.*—The vehicle compound is the same as in Example 8. To 80 parts of the vehicle is added 3 parts of concentrated Crocin scarlet 400, made by Heller and Merz, 1 part of ammonium hydroxide and 50 parts of water.

*Example 10.*—A mixture of 10 parts of zein, 6 parts of sodium resinate and 25 parts of water is agitated until a smooth viscous solution is formed. This dispersion is diluted with water and added to paper pulp in a beater, whereupon it disperses readily. The addition of a precipitating agent, aluminum sulfate, causes the zein-rosin mixture to be deposited on the fibres in insoluble form so that the finished paper contains this material uniformly dispersed on the fibres. In place of sodium resinate, ammonium resinate may be used. In place of aluminum sulfate, as precipitating agent, ferric chloride or zinc sulfate, or other substance of acidic nature which liberates rosin from combination with alkalies may be used.

*Example 11.*—10 parts of zein is agitated with a solution of 5 parts of sodium laurate in 50 parts of water. The resulting product is a clear solution suitable for preparation of grease-proof coatings. If desired, the film may be made more resistant to water by dipping it into a dilute solution of acetic acid and drying. The lauric acid is thereby liberated and acts as a plasticizer of the zein.

*Example 12*—10 parts of zein is mixed with 6 parts of ammonium soap of linseed oil fatty acids dissolved in 25 parts of water. The resulting dispersion can be diluted with water to any extent and is suitable for the production of coatings. Plasticizers such as glycerol, 1 to 2 parts, and urea 2 to 4 parts, may be added in order to give flexibility and toughness to the film.

*Example 13.*—10 parts of zein is dispersed in a solution of 6 parts of triethanolamine oleate dissolved in 50 parts of water. A clear solution is formed which may be diluted with water without precipitation of the zein.

*Example 14.*—The formula is the same as in Example 13 except that trimethylamine palmitate is used in place of triethanolamine oleate.

*Example 15.*—10 parts of zein is dissolved without the addition of heat in the solution of 10 parts of ammonium naphthenate in 25 parts of water. The dispersion is notable in that the rate of solution is very rapid and the resulting dispersion is brilliantly clear and capable of being diluted with water to any extent without any clouding whatever.

*Example 16.*—10 parts of stearic acid is neutralized with 70 parts of 2% sodium hydroxide solution. The soap solution is heated almost to boiling. 10 parts of zein is added and disperses easily. On cooling the mixture forms an almost solid gel, which, however, when diluted with water gives a very viscous solution even at low concentrations.

*Example 17.*—Water is added slowly to a mixture of 10 parts of Avitex S. F. (a salt of sulfated stearyl alcohol) and 10 parts of zein. The zein disperses easily but does not yield a clear solution. After standing overnight the mixture has a pasty consistency but on heating a clear dispersion is obtained.

*Example 18.*—20 parts of Igepon T. (sodium salt of ethane sulfonic acid substituted oleamid) is mixed with 10 parts of zein, 2 parts of concentrated ammonium hydroxide and sufficient water to make 120 parts. On heating this mixture the zein is dispersed yielding a clear dispersion after filtration to remove a small amount of insoluble matter.

*Example 19.*—20 parts of Nekal B. X. (which is a salt of an alkyl naphthalene sulfonic acid) is dissolved in water. To this solution is added 10 parts of zein and 4 parts of concentrated ammonium hydroxide. The zein becomes fluid but remains as a separate phase. Water is added with with heating. When the total volume reaches 300 parts, the mixture suddenly becomes homogeneous and clear. Presumably this behavior is due to the salting out effect of diluent salts present in the dispersing agent.

*Example 20.*—20 parts of Triton S-18 (the reaction product of a fatty acid with an aryl alkylated amine) is mixed with 10 parts of zein. A smooth paste is formed. The addition of water gives a gelatinous mixture which, on heating, dilution with additional water to a volume of 250 parts and the addition of ammonia in sufficient quantity to give an alkaline reaction, disperses all but a small amount of the zein. It is evident that the dispersing agent itself, in this example, is not soluble enough in water to yield a clear dispersion at the higher concentrations.

*Example 21.*—A mixture of 20 parts of Deceresol O. T. (25% concentration of the active material), which is the sodium salt of a sulfated dicarboxylic acid ester, is mixed with 10 parts of zein. A paste is formed which on standing overnight becomes a clear dispersion that may be diluted with water as desired.

*Example 22.*—10 parts of the alcohol soluble fraction of Igepon A. P. is mixed with 20 parts of water and 10 parts of zein. The zein disperses readily leaving only a small amount of insoluble material. The solution after dilution may be treated with sufficient dilute hydrochloric acid to give a pH of 1.5 without precipitating more than small amounts of zein. The commercial agent, Igepon A. P., without alcohol extraction, does not yield a satisfactory dispersion presumably because of the presence in such agent of inorganic salts which exert a salting out effect on the zein dispersing agent combination.

*Example 23.*—A vehicle for pigments suitable, for example, for application to porous kraft box paper because of the reduced penetration of the dispersion, in comparison with the ordinary zein alcohol solutions, can be made by mixing the following substances in proportions as follows:

| | Parts |
|---|---|
| Zein | 15 (8–15) |
| Tall oil | 15 |
| Ammonium hydroxide | 2 (1–3) |
| Butyl alcohol | 3 (1–5) |
| Urea | 5 (5–15) |
| Water | 75 |

To this may be added any suitable pigment such, for example, as Paris black 5 parts.

Tall oil is a known mixture of fatty acids and rosin acids. It combines with ammonium hydroxide to give an ammonia soap. The urea is a plasticizer to give the coating flexibility, and it is possible to use in place of it, the glycols, glycerine, invert sugars or other known zein plasticizers which are water soluble and neutral in respect to the hydroxyl substance. The butyl alcohol, for which another alcohol could be substituted, reduces viscosity so as to permit application of the paint compound at a higher total solids content. This is an example of a zein dispersion in a water-alcohol medium in which the alcohol is insufficient in amount to dissolve the zein to form a flowable mixture. The alcohol in this example is not used for the purpose of dissolving the zein, but to reduce viscosity, as stated, and improve the levelling and spreading character of the dispersion. This example, therefore, comes within the scope of the present invention and not of the invention of the Stewart application referred to.

*Example 24.*—A grease resisting coating for cardboard which will be tough and flexible, can be made in accordance with the following formula:

| | Parts |
|---|---|
| Zein | 15 |
| Sulfonated castor oil | 10 (8–15) |
| Urea | 5 (5–15) |
| Glycerine | 2 (2–6) |
| Butyl alcohol | 3 (1–5) |
| Water | 40 |

This is another example of a zein-water dispersion containing a zein solvent but in amount insufficient to dissolve the zein; the zein solvent, butyl alcohol, being used for a different and specific purpose, namely, to reduce viscosity.

*Example 25.*—100 parts of zein is dissolved in a solution of 50 parts of sodium resinate and 500 parts of water. Films made from this dispersion may be treated with a 5% solution of aluminum sulphate by spraying or dipping, and on drying the films will be found to have improved water resistance due to the liberation of the acidic component of the dispersing agent in an insoluble state.

*Example 26.*—A formula for zein compositions intended for coating paper and containing an acid wool dye is as follows:

| | Parts |
|---|---|
| Zein | 15 |
| Tall oil, wood rosin or abietic acid | 5–15 |
| Ammonia | 1.0–3 |
| Glycerin | 0–4 |
| Urea | 0–4 |
| Water | 40–100 |
| A water soluble wool dye such as acid aniline dye | 0.1–1 |

Other wool dyes may be used such as the calcoid or calcimine dyes made by the Calco Chemical Company.

It has been found that a coating laid down from the above aqueous zein dispersion will not bleed when water is added and will produce a water resistant coating. The water resistance may be improved by heating the coating to temperatures between 100° and 110° C. (212°–230° F.)

The dye appears to permanently dye the zein in a manner similar to that in which wool is dyed by this type of acid dye. Only a very small quantity of the dye is required which makes the process cheap. The water dispersion of the zein does not penetrate the paper but lies on the surface thus giving a very glossy coating.

The dyed zein dispersion can be applied to paper in any usual manner. It is also possible to blend paper with such zein dispersion by the use of engraving rolls similar to those used in blending cloth.

I claim:

A composition of matter suitable for production of coatings, consisting of an aqueous zein dispersion which comprises the following substances in quantities by weight substantially as follows: zein 15 parts; sulfonated castor oil 8 to 15 parts; urea 5 to 15 parts; glycerine 2 to 6 parts; butyl alcohol 1 to 5 parts; and water in quantity to give the composition a flowable consistency.

ALBERT LUTHER JAMES.

CERTIFICATE OF CORRECTION.

Patent No. 2,377,237. May 29, 1945.

ALBERT LUTHER JAMES.

It is hereby certified that error appears in the printed specification of the above numbered patent requiring correction as follows: Page 5, first column, line 19, in the table, strike out "(8-15)" and insert the same after the numeral "15" in line 20, same table; and that the said Letters Patent should be read with this correction therein that the same may conform to the record of the case in the Patent Office.

Signed and sealed this 11th day of September, A. D. 1945.

Leslie Frazer (Seal) First Assistant Commissioner of Patents.